(12) United States Patent
Holbery et al.

(10) Patent No.: US 10,690,829 B2
(45) Date of Patent: Jun. 23, 2020

(54) LIGHT-EMITTING TEXTILE WITH OPTICAL FIBERS

(71) Applicant: Microsoft Technology Licensing, LLC, Redmond, WA (US)

(72) Inventors: James David Holbery, Bellevue, WA (US); Siyuan Ma, Bothell, WA (US); Kelly Marie Bogan, Redmond, WA (US); Benjamin Sullivan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/618,079

(22) Filed: Jun. 8, 2017

(65) Prior Publication Data

US 2018/0356579 A1    Dec. 13, 2018

(51) Int. Cl.
| | |
|---|---|
| *H01L 51/52* | (2006.01) |
| *H01L 51/56* | (2006.01) |
| *H01L 27/32* | (2006.01) |
| *H01L 51/00* | (2006.01) |
| *F21V 8/00* | (2006.01) |
| *F21V 9/08* | (2018.01) |
| *F21V 23/06* | (2006.01) |
| *F21V 33/00* | (2006.01) |

(Continued)

(52) U.S. Cl.
CPC ........... *G02B 6/001* (2013.01); *A41D 27/085* (2013.01); *F21V 9/08* (2013.01); *F21V 23/06* (2013.01); *F21V 33/0008* (2013.01); *F21Y 2115/10* (2016.08)

(58) Field of Classification Search
CPC ... B60Q 1/2615; G02B 6/0005; G02B 6/0003
See application file for complete search history.

(56) References Cited

U.S. PATENT DOCUMENTS

| | | | |
|---|---|---|---|
| 4,907,132 A * | 3/1990 | Parker | ................... D03D 15/00 362/556 |
| 5,603,648 A * | 2/1997 | Kea | ...................... B63C 9/1255 441/106 |

(Continued)

FOREIGN PATENT DOCUMENTS

| | | |
|---|---|---|
| EP | 359450 A2 | 3/1990 |
| EP | 3296626 A1 | 3/2018 |

(Continued)

OTHER PUBLICATIONS

Written Research Opinion of ISA for WO2018226403, dated Dec. 2018 (Year: 2018).*

(Continued)

*Primary Examiner* — Tracie Y Green
(74) *Attorney, Agent, or Firm* — Alleman Hall Creaseman & Tuttle LLP (57) ABSTRACT

Examples disclosed herein relate to using optical fibers in a textile to channel light from a light source to various exit locations within the textile. One example provides an optical device, comprising a light source, an optical fiber extending from the light source, the optical fiber configured to conduct light received from the light source via internal reflection, and a plurality of individually controllable light-emitting locations disposed along the optical fiber.

20 Claims, 5 Drawing Sheets

(51) Int. Cl.
  *A41D 27/08* (2006.01)
  *F21Y 115/10* (2016.01)

(56) References Cited

U.S. PATENT DOCUMENTS

| | | | |
|---|---|---|---|
| 6,851,844 B2 | 2/2005 | Guy | |
| 7,164,819 B2* | 1/2007 | Jenson | G02B 6/001 385/39 |
| 8,031,998 B2* | 10/2011 | Booth | G02B 6/001 385/100 |
| 9,022,631 B2* | 5/2015 | Mulder | G02B 6/006 362/601 |
| 9,410,694 B2* | 8/2016 | Curran | F21V 33/0008 |
| 9,807,852 B1* | 10/2017 | Starner | H05B 45/00 |
| 2006/0087832 A1 | 4/2006 | Peng et al. | |
| 2006/0144460 A1 | 7/2006 | Brochier et al. | |
| 2006/0257095 A1 | 11/2006 | Walt et al. | |
| 2007/0133935 A1 | 6/2007 | Fine | |
| 2009/0052167 A1 | 2/2009 | Ono | |
| 2013/0336004 A1* | 12/2013 | Mulder | G02B 6/006 362/609 |
| 2014/0347845 A1 | 11/2014 | Pulido, Jr. | |
| 2015/0250043 A1* | 9/2015 | Timmerberg | B62J 6/005 315/153 |
| 2015/0279320 A1 | 10/2015 | Hull | |
| 2016/0174321 A1* | 6/2016 | Mason | H05B 33/0872 315/153 |
| 2016/0338169 A1* | 11/2016 | Rantala | H05B 45/20 |
| 2018/0214026 A1* | 8/2018 | Goodall | A61B 5/0091 |

FOREIGN PATENT DOCUMENTS

| | | | |
|---|---|---|---|
| WO | 2005034070 A2 | | 4/2005 |
| WO | WO2005-034070 | * | 4/2005 |
| WO | 2012060524 A1 | | 5/2012 |
| WO | WO2012-060524 | * | 5/2012 |

OTHER PUBLICATIONS

"International Search Report and Written Opinion Issued in PCT Application No. PCT/US2018/034016", dated Nov. 20, 2018, 15 Pages.

* cited by examiner

LIGHT-EMITTING TEXTILE WITH OPTICAL FIBERS

BACKGROUND

A device may utilize a plurality of individually controllable light sources, such as light-emitting diodes (LEDs), to display a message or image.

SUMMARY

Examples are disclosed that relate to using optical fibers in a textile to channel light from a light source to various light-emitting locations across the textile. One example provides an optical device comprising a light source, an optical fiber extending from the light source, the optical fiber configured to conduct light received from the light source via internal reflection, and a plurality of individually controllable light-emitting locations disposed along the optical fiber.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Many light emitting devices are rigid, relatively heavy, and/or are relatively large in dimension, and thus are not suited for incorporating into flexible and/or wearable goods, such as clothing and other textiles. Thus, examples are disclosed that relate to the use of optical fibers in a textile to channel light from a light source to various exit locations within the textile. The use of optical fibers within the textile may allow light patterns to be emitted in a controllable manner with relatively high pixel density. Further, various methods may be used to provide control over light emission from each individual light-emitting location, thereby allowing control over a light pattern emitted by the overall device.

Figure 1:
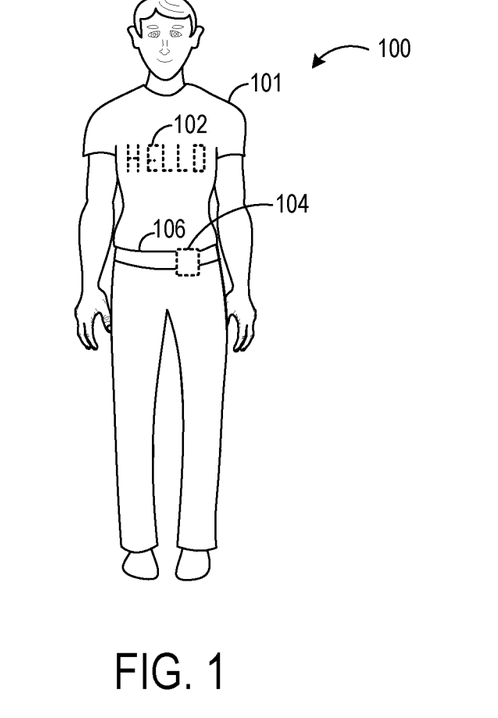
FIG. 1 shows an example light-emitting device.

FIG. 1 shows an example light-emitting device 100 in the form of a wearable clothing item 101 incorporating one or more optical fibers to illuminate a light pattern 102. A controller 104 capable of controlling light patterns emitted by the light-emitting device 100 may be mounted on the wearable clothing item 101, or may be incorporated in another article, such as a belt 106, that communicates via a wired or wireless connection with circuitry on the wearable clothing item 101 to control the light sources and/or individually indexed light-emitting locations. One or more light sources for introducing light into the optical fiber(s) is provided on the wearable clothing item 101. Such light sources may take any suitable form, such as packaged light emitting diodes (LEDs), organic light emitting devices (OLEDs), or unpackaged micro-LEDs. Unpackaged micro-LEDs may have a smaller size than packaged LEDs, and thus may be less noticeable to a wearer. Further, any other suitable components may be located on the wearable clothing item 101 and/or other wearable or portable item(s) in communication with the wearable clothing item 101. Examples include, but are not limited to, batteries, optical components, and user input devices.

Figure 2:
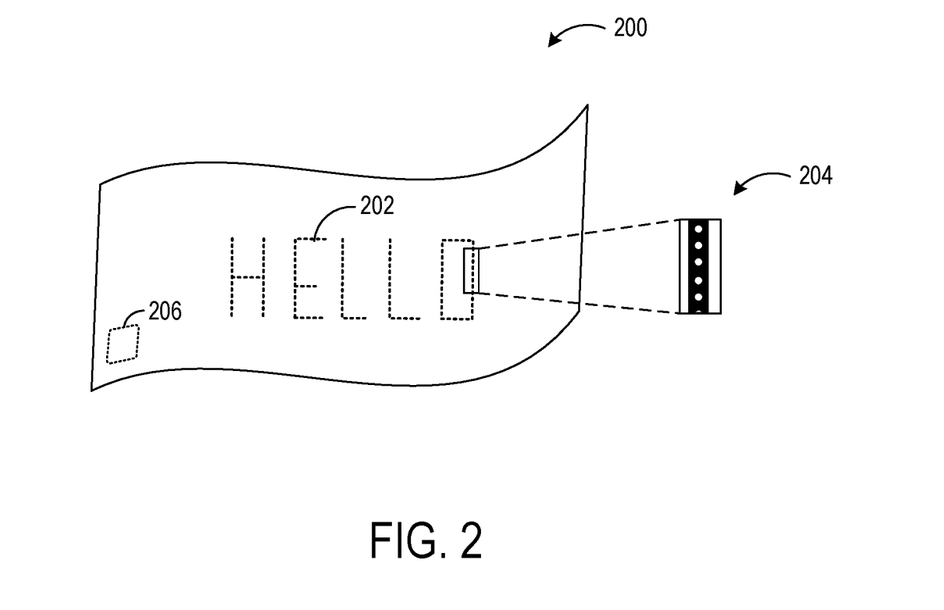
FIG. 2 shows another example light-emitting device.

FIG. 2 shows another example light-emitting device 200 in the form of a banner that incorporates one or more optical fibers as disclosed herein to provide for a controllable light pattern 202. Magnified view 204 illustrates a portion of a matrix of pixels provided by the optical fibers, with selected pixels controlled to emit light to form the depicted portion of the light pattern 202. Pixels may be selectively controlled to emit or block light via a controller 206, allowing the illumination of desired light patterns, characters, words, images, icons, etc. While depicted herein as an article of clothing and a banner, it will be understood that any other suitable items may utilize optical fiber light emitters as disclosed herein, such as other clothing items (e.g. costumes, high visibility safety clothing), soft electronics (e.g. fabric covered computers), upholstered furniture, parts (e.g. seats, carpets, and/or other textile-containing parts) for automobiles, airplanes and other vehicles, and floor coverings.

Figure 3A:
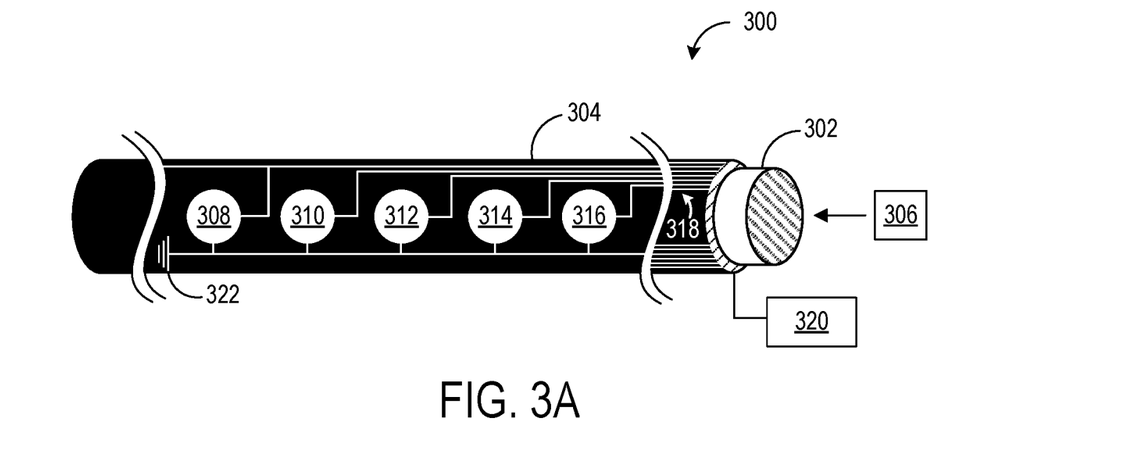
FIG. 3A schematically shows an example optical fiber comprising individually controllable light-emitting locations and conductive traces.

FIG. 3A schematically shows an example optical fiber 300 comprising individually controllable light-emitting locations that may be incorporated into a textile or other flexible article, such as a polymer sheet-based article. One or more of such optical fibers may be incorporated into a textile or other flexible article in any suitable manner, such as by weaving, knitting, embroidery, adhesion, and/or lamination (e.g. between the textile and a thermoplastic adhesive layer). The optical fiber 300 may include a core 302 and an outer coating 304. In some examples, the outer coating 304 may comprise a material having a different refractive index than the core material. Light from a light source 306 may be introduced at one end of the optical fiber 300, and propagate through the optical fiber 300 via total internal reflection (TIR). The light source 306 may take the form of a bare micro-LED die, a packaged LED, OLED, or a laser, as examples, and may be configured to emit any desired wavelength or wavelengths of light. In some examples, the light source 306 may include a color converter, such as a population of quantum dots of selected sizes, configured to absorb light of one wavelength from the light source 306

(e.g. blue light) and emit light of other colors (e.g. green and red light). In other examples, the light source may emit light in the infrared range.

FIG. 3A also shows example individually controllable light-emitting locations as locations 308, 310, 312, 314, and 316. The optical fiber 300 may include any suitable structure (s) for permitting control of light emissions from the optical fiber 300. As mentioned above, an outer coating 304, such as a cladding, may be provided on the optical fiber 300 to set a desired critical angle for TIR, and the outer coating 304 may be varied at the light-emitting locations 308-316 to change the critical angle for TIR at those locations. For example, the outer coating 304 may be absent at the light-emitting locations 308-316, may be absent from locations other than the light-emitting locations 308-316, or may be formed from a different material having a different refractive index at the light-emitting locations 308-316 than at other locations. As another example, reflective or refractive features (or, where a coherent light source is used, diffractive features) may be formed in the optical fiber 300 at the light-emitting locations 308-316 to redirect light out of the optical fiber 300. As a more specific example, a plurality of bump-shaped or prism-shaped features may be formed in the optical fiber 300 at the light-emitting locations to disrupt total internal reflection at those locations, as described in further detail with regard to FIG. 5. A density of such features may increase as a function of distance of a light-emitting location from a light source to help maintain a relatively consistent light emission brightness along a length of an optical fiber. As yet another example, the outer coating 304 may be reflective or absorptive along its length, with windows formed in the outer coating 304 at the light emitting locations 308-316 through which light can escape.

The optical fiber 300 may include any suitable structure to provide for the individual control of the light-emitting locations 308-316. In some examples, an optical fiber may include an electrochromic structure disposed over each of the light-emitting locations, and conductive traces to allow for the control of an opacity of the electrochromic material. Any suitable electrochromic technology may be used. Examples include, but are not limited to, tungsten oxide-based, polyanaline-based, and polyoxotungstate-based electrochromic structures. Further, the electrochromic structures may be formed in any suitable manner. As one example, a length of the optical fiber 300 may be coated with the various layers that form an electrochromic structure, which then may be patterned to form individually controllable electrochromic locations over the light-emitting locations. As another example, masking techniques may be used to mask portions of the optical fiber 300 while depositing the layers of the electrochromic structure.

Figure 4:
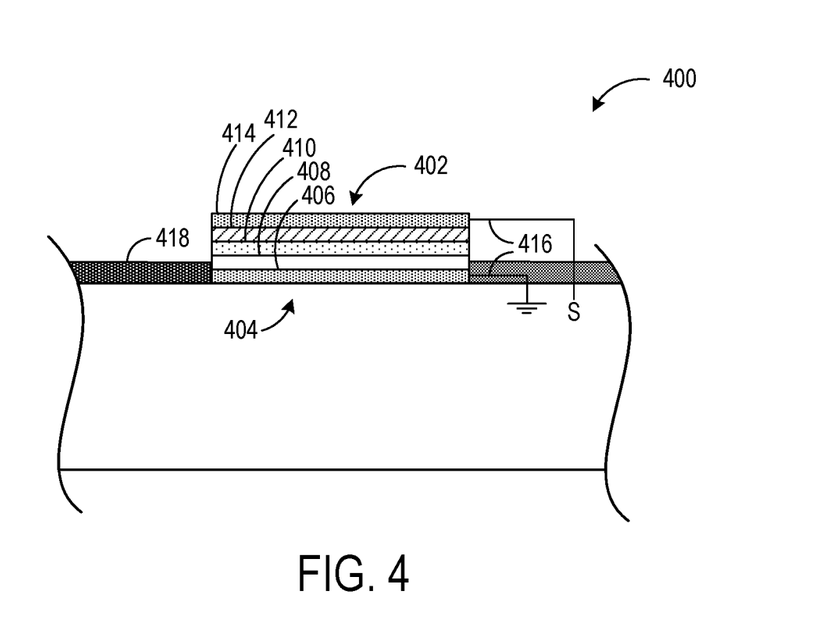
FIG. 4 shows a schematic depiction of an example optical fiber coated with an electrochromic structure formed over a light-emitting location.

FIG. 4 shows a schematic depiction of an example optical fiber 400 coated with layers forming an electrochromic structure 402 over a light-emitting location 404. Thicknesses of the layers are exaggerated for clarity. The depicted layers include a first transparent conductive electrode 406 (for example, indium tin oxide) formed on the optical fiber 400, an ion storage layer 408 (e.g. nickel oxide (NiO)) formed on the first electrode 406, an ionic conductor (electrolyte) layer 410 (e.g. $Ta_2O_5$ or $ZrO_2$) formed on the ion storage layer 408, an electrochromic layer 412 (e.g. $WO_3$) formed on the ionic conductor layer, and a second transparent electrode 414 (e.g. indium tin oxide) formed on the electrochromic layer 412. In the depicted example, the first electrode is shown as a signal electrode (S), and the second electrode is a ground electrode. Each of the depicted layers may be formed on the optical fiber 400 using techniques similar to those used to deposit such layers on flat substrates. Further, as mentioned above, either masking during deposition or etching after deposition may be used to form individually controllable electrochromic segments. After forming the individually controllable electrochromic segments, electrical connections 416 may be made to the first and second electrode layers by forming metal traces along the optical fiber 400 prior to incorporating the optical fiber into the textile, or by printing a conductive ink onto the textile or other flexible article after incorporating the optical fiber 400 into the article. Also, as mentioned above, areas of the optical fiber 400 between the individually controllable light emitting locations may be covered with an opaque material 418 to prevent light from leaking out of the optical fiber 400 between the light-emitting locations. Such an opaque coating may be applied either over or beneath the electrochromic structure 402. In some examples, the opaque material 418 may have a same color as, or a complementary color to, other fibers in a textile item, such that the coated optical fiber contributes to the aesthetic design of the article in which it is incorporated.

FIG. 3A further illustrates a plurality of conductive traces 318 configured to provide control signals from an external controller 320 to electrodes at each light-emitting location. Additional conductive traces may be located around the optical fiber 300 that connect to additional light-emitting locations along the optical fiber 300. As one example, 10-20 light-emitting locations may be located per optical fiber. Such an optical fiber may have a length of 10 to 50 centimeters for some wearable applications in some examples. The conductive traces 318 may be formed on the optical fiber in any suitable manner. As examples, the conductive traces 318 may be printed onto the optical fiber 300 with a conductive material, such as a paste or ink formed from silver, a carbon or carbon-based material (e.g. graphite, graphene, carbon black), a conductive polymer (e.g. polypyrrole or poly(3,4-ethylenedioxythiophene) polystyrene sulfonate (PEDOT:PSS)), or suitable composites thereof. In other examples, metallic conductors may be deposited in a pattern by physical vapor deposition, plating, or other suitable methods. Suitable masking and/or etching steps may be used to create a desired pattern of conductive traces in such examples. Further, in some examples, a protective electrically insulating layer (e.g. polypropylene) may be applied over the conductive traces 318 for protection.

The controller 320 may be mounted on the textile or other flexible article in which optical fiber 300 is incorporated, or may be remotely located from the article. As shown in the example of FIG. 1, for a wearable clothing item such as a shirt, the controller 320 may be mounted on another wearable article such as a belt, and the controller 320 may connect to a communications device on the textile material, wirelessly or via a wired connection, to control the emission of light from the optical fiber 300. Each of the light-emitting locations 308-316 also may include an electrode connected to a common ground 322.

Figure 3B:
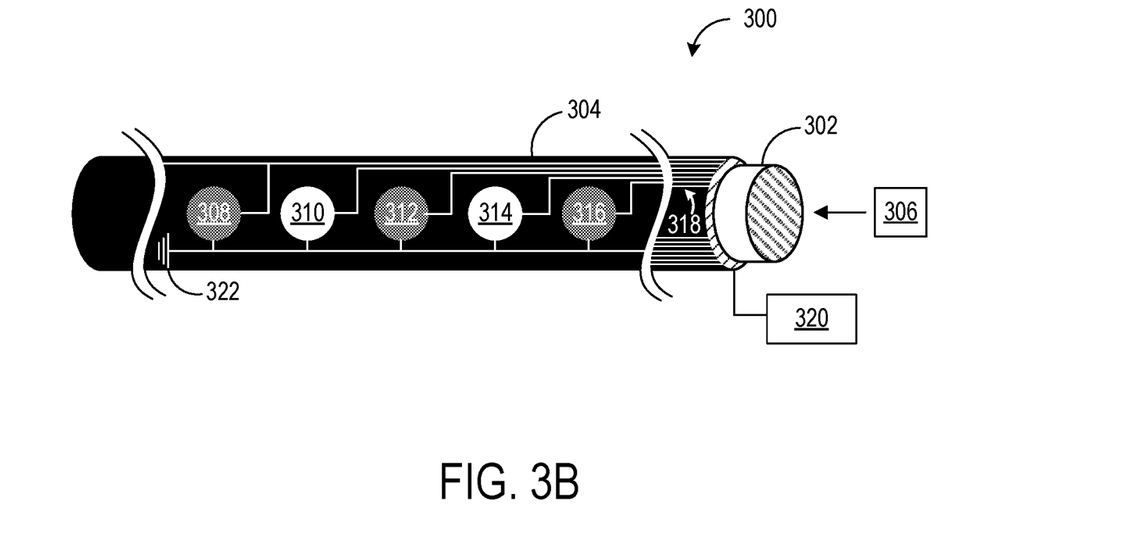
FIG. 3B schematically shows the optical fiber of FIG. 3A with different light-emitting locations in different states.

FIG. 3B schematically shows an example state of the optical fiber 300 of FIG. 3A with different voltages applied to different light-emitting locations to vary the light output from the light-emitting locations. For example, a first, higher voltage may be provided to light-emitting locations 308, 312, and 316 such that the electrochromic layer is opaque and blocks light, while a second, lower voltage (or alternatively no voltage) may be provided to light-emitting locations 310 and 314 such that the electrochromic layer is transparent and light is emitted. It will be understood that FIGS. 3A and 3B are not to scale, and that the various components are depicted for illustrative purposes.

In another example, instead of using electrochromic materials, each light-emitting location 308-316 may comprise a wavelength selective filter (e.g. a multilayer dielectric filter) configured to pass a selected wavelength range of light, thereby acting as a narrow bandpass filter. In such a configuration, conductive traces for individual control of each light-emitting location may be omitted. Instead, the wavelength range of light that is input into the optical fiber 300 may be modulated via the controller 320 (e.g. by controlling a light source, such as a micro-LED die, used to input light into the optical fiber 300) to cause light to be emitted at selected locations. In such a configuration, the use of a larger number of light sources may permit more granular control over the locations from which light is emitted. In yet other examples, an angle-selective filter may be used, such as a surface relief grating, a volume hologram, or other suitable diffractive element. In such examples, an angle at which light is input into the optical fiber may be varied (e.g. by a mechanically scanning mirror such as a MEMS mirror, or by illuminating different light sources at different angles to an optical input of the optical fiber) to control the locations from which light is emitted. Such wavelength-selective and angle-selective filters may be configured such that a predetermined pattern of light may be emitted based upon a particular wavelength range of light input to the optical fiber 300.

Figure 5:
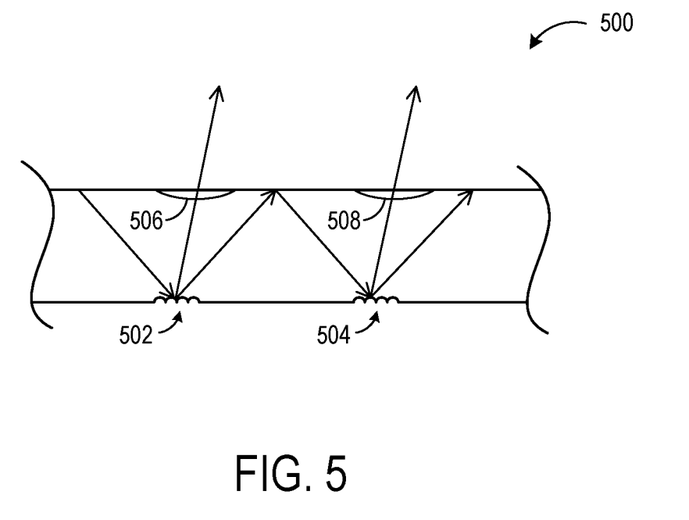
FIG. 5 shows a schematic depiction of an example optical fiber comprising light redirecting features.

As mentioned above, reflective, refractive, or diffractive features may be disposed on or formed in the optical fiber at the light-emitting locations to redirect light out of the optical fiber. FIG. 5 shows a schematic depiction of an example optical fiber 500 having light redirecting features 502 and 504 to redirect light toward corresponding light-emitting locations 506 and 508. The depicted light redirecting features 502 and 504 are formed in the optical fiber in an opposite side of the optical fiber 500 from the light-emitting locations 506 and 508 to reflectively and/or refractively direct light toward the light-emitting locations, as shown schematically by example light path arrows. In other examples that utilize coherent light sources, diffractive redirective elements (e.g. surface relief gratings or other type of grating) may be used. As described above, various methods may be used to control whether the redirected light is emitted or blocked from emission. Further, in other examples, redirecting features may be formed in a same side of the optical fiber as the light-emitting locations.

Figure 6:
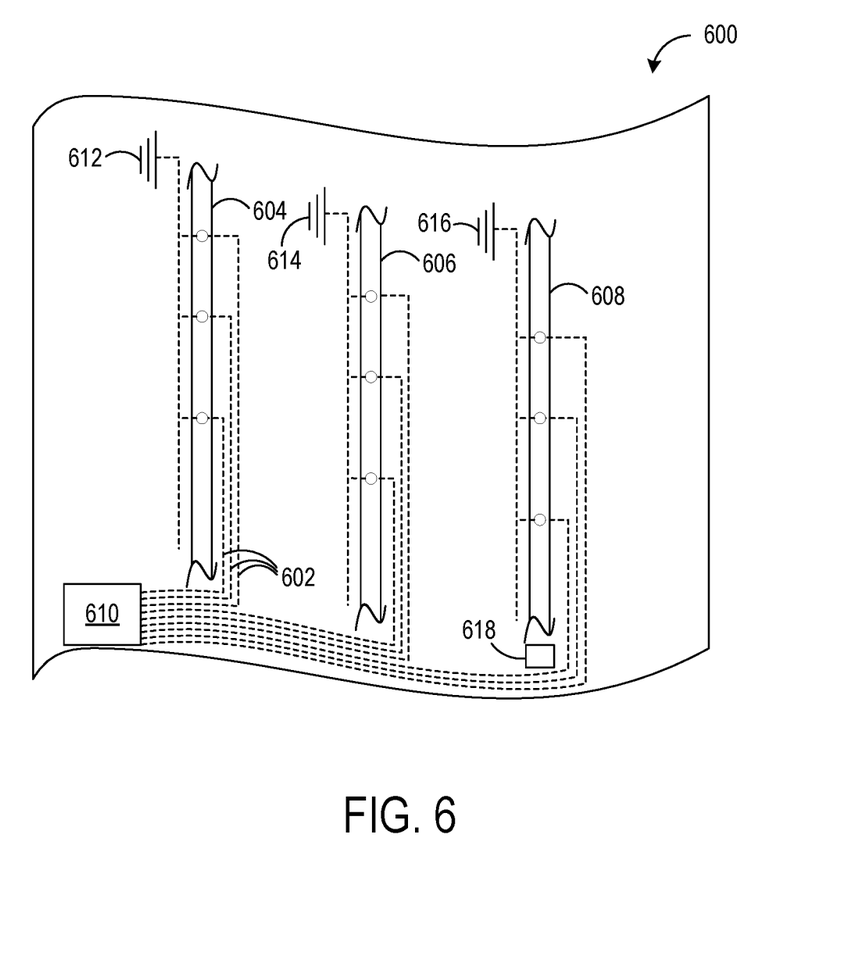
FIG. 6 shows an example textile material comprising conductive traces.

In some examples, instead of forming conductive traces on the optical fiber, conductive traces may be formed on a textile material incorporating the optical fiber, such as by printing an electrically conductive ink onto the textile at locations to connect with the electrodes in an electrochromic segment. FIG. 6 schematically shows an example textile material 600 having conductive traces 602 configured to provide control signals to a plurality of light-emitting locations in optical fibers 604, 606, and 608 incorporated into the textile material 600. The traces may be covered with a protective layer, such as a laminated thermoplastic layer, for protection. In some examples, a protective layer may first be applied to the fabric, then the conductive traces applied onto the protective layer, and then another protective layer may be applied over the traces to fully encapsulate the traces.

The optical fibers may be coupled with the textile material 600 in any manner. For example, the optical fibers 604, 606, and 608 may be interwoven with textile fibers, embroidered onto the textile, or laminated or adhered to the textile. Further, the optical fibers 604, 606, and 608 may be included in the textile material 600 in any suitable locations and/or density. In some examples, the conductive traces 602 may be located on an underside of the textile material 600 (e.g. an inside surface of an article of clothing) rather than a front side of the textile material 600 to make the traces less visible, while in other examples the traces may be disposed on an outside of the textile material as a design element. A controller 610 may be coupled with the textile to provide control signals via the conductive traces 602 to control an opacity of an electrochromic structure at each of a plurality of light-emitting locations along each of the optical fibers 604, 606, and 608. The electrochromic structure at each light-emitting location may be connected to a common ground, as shown at 612, 614, and 616. A light source may provide light to each optical fiber, such as light source 618 shown for optical fiber 608.

In some examples, the optical fibers and light-emitting locations in a textile material may be arranged in such a manner such that resulting pixel density is approximately 0.5 mm between pixels. In other examples, the optical fiber and textile may be configured such that the pixel density is either higher or lower.

Some articles, such as floor coverings, clothing, blankets/covers, and upholstery, may be exposed to harsh conditions, abrasion, many flexing cycles, and other wear-and-tear. For example, clothing may be repeatedly laundered. As such, the optical fibers may be configured to be sufficiently flexible, waterproof, and/or resistant to soaps, detergents, and elevated temperatures to resist damage from such conditions for a desired product lifetime. Where the optical fiber structure alone is not sufficiently resistant to such conditions, the optical fiber structures and/or the entire textile or other article in which the fibers are incorporated may be treated with a protective layer, such as damage-resistant electrically insulating polymer outer layer. Additionally or alternatively, the optical fibers may be incorporated within a fabric or other substrate at locations less likely to encounter abrasive, rough conditions. In yet other examples, any other suitable protective measures may be taken.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
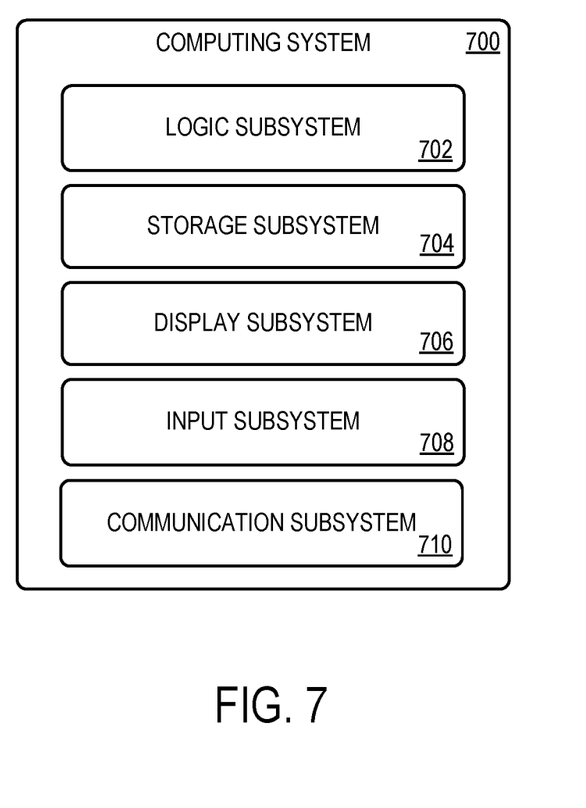
FIG. 7 shows an example computing device.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Controller 104, controller 206, controller 320 and controller 610 are examples of computing system 700.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 702 may include one or more processors configured to execute software instructions. Additionally or alternatively, the logic subsystem 702 may include one or more hardware or firmware logic machines configured to execute hardware or firmware instructions. Processors of the logic subsystem 702 may be single-core or multi-core, and the instructions executed thereon may be configured for sequential, parallel, and/or distributed processing. Individual components of the logic subsystem 702 optionally may be distributed among two or more separate devices, which may be remotely located and/or configured for coordinated processing. Aspects of the logic subsystem 702 may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage subsystem 704, and thus transform the state of the storage subsystem 704, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 706 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides an optical device comprising a light source, an optical fiber extending from the light source, the optical fiber configured to conduct light received from the light source via internal reflection, and a plurality of individually controllable light-emitting locations disposed along the optical fiber. Each individually controllable light-emitting location may additionally or alternatively include an electrochromic material. The optical device may additionally or alternatively include conductive traces configured to provide current to each individually controllable light-emitting location, and a common ground connected to each individually controllable light-emitting location. The conductive traces may additionally or alternatively be formed on the optical fiber. The optical device may additionally or alternatively be incorporated into a textile article, and wherein the conductive traces are formed on the textile article. Each individually controllable light-emitting location may additionally or alternatively include a wavelength selective filter configured to pass a selected wavelength range of light. The optical fiber may additionally or alternatively include a cladding configured to cause the optical fiber to selectively emit light at the individually controllable light-emitting locations. Each individually controllable light-emitting location may additionally or alternatively include an opening formed in a coating surrounding the optical fiber. The optical fiber may additionally or alternatively include a reflective, refractive, and/or diffractive feature configured to cause the optical fiber to selectively emit light at the individually controllable light-emitting locations. The optical device may additionally or alternatively be incorporated into a flexible article comprising a flexible polymer sheet. The optical device may additionally or alternatively be incorporated into a textile article.

Another example provides a textile article, comprising a textile material, a light source, an optical fiber extending from the light source along the textile material and configured to conduct light received from the light source via internal reflection, and a plurality of individually controllable light-emitting locations disposed along the optical fiber. Each individually controllable light-emitting location may additionally or alternatively include an electrochromic material. Each individually controllable light-emitting location may additionally or alternatively include a wavelength selective filter configured to pass a selected wavelength range of light. The textile article may additionally or alternatively include a controller mounted to the textile material and configured to control emission of light from the individually controllable light-emitting locations. The textile article may additionally or alternatively include a communications device configured to communicate with a remotely located controller to control emission of light from the individually controllable light-emitting locations.

Another example provides a textile article, comprising a textile material, a light source supported on the textile material, an optical fiber extending from the light source along the textile material configured to conduct light received from the light source via internal reflection, a plurality of individually controllable light-emitting locations disposed along the optical fiber, and a plurality of conductive traces printed onto the textile material and configured to provide control signals to the individually controllable light-emitting locations. Each individually controllable light-emitting location may additionally or alternatively include an electrochromic material. Each individually controllable light-emitting location may additionally or alternatively include a wavelength selective filter configured to filter a selected wavelength range of light. The plurality of conductive traces may additionally or alternatively include a common ground connected to each individually controllable light-emitting location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical device, comprising:
a light source;
one or more optical fibers extending from the light source, the one or more optical fibers configured to conduct light received from the light source via internal reflection; and
at least one of the one or more optical fibers having a plurality of individually controllable light-emitting locations disposed along the optical fiber, wherein each light-emitting location is controllable to emit light independently of other light-emitting locations.

2. The optical device of claim 1, wherein each individually controllable light-emitting location comprises an electrochromic material.

3. The optical device of claim 2, further comprising conductive traces configured to provide current to each individually controllable light-emitting location, and a common ground connected to each individually controllable light-emitting location.

4. The optical device of claim 3, wherein the conductive traces are formed on the optical fiber.

5. The optical device of claim 3, wherein the optical device is incorporated into a textile article, and wherein the conductive traces are formed on the textile article.

6. The optical device of claim 1, wherein each individually controllable light-emitting location comprises a wavelength selective filter configured to pass a selected wavelength range of light.

7. The optical device of claim 1, wherein the optical fiber comprises a cladding configured to cause the optical fiber to selectively emit light at the individually controllable light-emitting locations.

8. The optical device of claim 1, wherein each individually controllable light-emitting location comprises an opening formed in a coating surrounding the optical fiber.

9. The optical device of claim 1, wherein the optical fiber comprises a reflective, refractive, and/or diffractive feature configured to cause the optical fiber to selectively emit light at the individually controllable light-emitting locations.

10. The optical device of claim 1, wherein the optical device is incorporated into a flexible article comprising a flexible polymer sheet.

11. The optical device of claim 1, wherein the optical device is incorporated into a textile article.

12. A textile article, comprising:
a textile material;
a light source;
one or more optical fibers extending from the light source along the textile material and configured to conduct light received from the light source via internal reflection; and
at least one of the one or more optical fibers having a plurality of individually controllable light-emitting locations disposed along the optical fiber, wherein each light-emitting location is controllable to emit light independently of other light-emitting locations.

13. The textile article of claim 12, wherein each individually controllable light-emitting location comprises an electrochromic material.

14. The textile article of claim 12, wherein each individually controllable light-emitting location comprises a wavelength selective filter configured to pass a selected wavelength range of light.

15. The textile article of claim 12, further comprising a controller mounted to the textile material and configured to control emission of light from the individually controllable light-emitting locations.

16. The textile article of claim 12, further comprising a communications device configured to communicate with a remotely located controller to control emission of light from the individually controllable light-emitting locations.

17. A textile article, comprising:
a textile material;
a light source supported on the textile material;
one or more optical fibers extending from the light source along the textile material configured to conduct light received from the light source via internal reflection;
at least one of the one or more optical fibers having a plurality of individually controllable light-emitting locations disposed along the optical fiber; and
a plurality of conductive traces printed onto the textile material and configured to provide control signals to the individually controllable light-emitting locations.

18. The textile article of claim 17, wherein each individually controllable light-emitting location comprises an electrochromic material.

19. The textile article of claim 17, wherein each individually controllable light-emitting location comprises a wavelength selective filter configured to filter a selected wavelength range of light.

20. The textile article of claim 17, wherein the plurality of conductive traces comprises a common ground connected to each individually controllable light-emitting location.

* * * * *